US008693146B2

(12) United States Patent
Dommerque

(10) Patent No.: US 8,693,146 B2
(45) Date of Patent: Apr. 8, 2014

(54) QUENCH DETECTION SYSTEM FOR A SUPERCONDUCTOR FAULT CURRENT LIMITER

(75) Inventor: Robert Dommerque, Schwerte (DE)

(73) Assignee: Nexans, Paris (FR)

( * ) Notice: Subject to any disclaimer, the term of this patent is extended or adjusted under 35 U.S.C. 154(b) by 158 days.

(21) Appl. No.: 13/208,620

(22) Filed: Aug. 12, 2011

(65) Prior Publication Data

US 2012/0044603 A1 Feb. 23, 2012

(30) Foreign Application Priority Data

Aug. 23, 2010 (EP) .................................... 10305910

(51) Int. Cl.
*H02H 7/00* (2006.01)

(52) U.S. Cl.
USPC ........................................................... 361/19

(58) Field of Classification Search
USPC ........................................................... 361/19
See application file for complete search history.

(56) References Cited

U.S. PATENT DOCUMENTS 4,402,028 A * 8/1983 Udren ............................ 367/36
4,996,472 A * 2/1991 Mallick, Jr. .................. 324/71.6
5,731,939 A 3/1998 Gross et al.
5,796,630 A * 8/1998 Maeda et al. ................. 361/160
5,999,383 A * 12/1999 Hall et al. ....................... 361/19
7,724,483 B2 * 5/2010 Bray et al. ...................... 361/19

FOREIGN PATENT DOCUMENTS

DE 19939066 A1 * 3/2001 ............... H02H 9/02
JP 59152604 8/1984
JP 2009206237 9/2009

OTHER PUBLICATIONS

English Machine Translation of DE19939066A1, Branston et al.*

* cited by examiner

*Primary Examiner* — Jared Fureman
*Assistant Examiner* — Kevin J Comber
(74) *Attorney, Agent, or Firm* — Sofer & Haroun, LLP

(57) ABSTRACT

A quench detection system for a fault current limiter (1), in particular, a high temperature superconductor fault current limiter, making use of a differential protection relay wherein in fault event the differential protection relay operates a triggering mechanism of a circuit breaker (2), thereby opening the electrical circuit and interrupting power supply to downstream components, and a method for quench detection wherein the magnitude of voltage drop during quench is converted to a current signal being proportional to the voltage and which is monitored by the differential protection relay.

11 Claims, 2 Drawing Sheets

QUENCH DETECTION SYSTEM FOR A SUPERCONDUCTOR FAULT CURRENT LIMITER

RELATED APPLICATION

This application claims the benefit of priority from European Patent Application No, 10305910.1, filed on Aug. 23, 2010, the entirety of which is incorporated by reference.

BACKGROUND

1. Field of the Invention

The present invention relates to a quench detection system for a superconducting fault current limiter and to means for quench detection in a superconducting fault current limiter.

2. Description of the Related Art

A fault current limiter is a device which automatically limits fault currents in electrical distribution or transmission networks, in particular high voltage networks, to a low current value close to the nominal current. The benefit of such a device is that it reduces drastically the short circuit power of the high voltage network and, thus, allows to interconnect networks without increasing the short circuit power or to decrease safety margins so that other machineries connected to the network can be designed for lower short circuit power and, therefore, can be made lighter and cheaper.

Superconductors, especially high-temperature superconductors, are well suited for use in a fault current limiter due to their property to lose superconductivity and transit from the non-resistive superconducting state to a normal state with high electric resistivity when at least one of the critical current (Ic), the critical temperature (Tc) or the critical magnetic field (Hc) of the superconductor material is exceeded. This transition from the superconducting state to the normal resistive state is referred to "quenching".

In normal operation with nominal current In, that is, in the cooled state, the superconductor material is in its superconducting state with essentially zero resistance so that there is essentially no voltage over the whole fault current limiter—the fault current limiter is "invisible" for the network. In case of short circuit fault current the current rises to several times the nominal current In exceeding Ic of the superconductor material which causes the superconducting material to transit to the normal resistive state with generation of high voltage. That is, in normal operation in the superconducting state essentially no voltage difference is observed at both ends of the fault current limiter, whereas in fault condition a large voltage difference is measured due to increasing electrical resistance.

In quenching the superconductor material has to absorb a large quantity of energy and, in the consequence, is heated up.

In order to avoid overheating and damage of the fault current limiter current flow through the fault current limiter must be interrupted within a limited period of time. Since the process of quenching proceeds within a very short time of only some tens of milliseconds quench detection must be very fast. Thus, means for quench detection are provided which, on quench, send a fault signal to a circuit breaker for switching off current flow.

In the prior art various method for quench detection are known.

For example, EP 0 828 331 relates to a high temperature superconducting coil assembly with individual coils being connected in series. At both end portions of the coil assembly a flux loop is provided. In case of quench an unbalance occurring in the flux loops is detected and serves to open an off-switch.

U.S. Pat. No. 5,999,383 relates to the detection of quench by measuring voltage between the superconducting state with about no voltage difference and the resistive state with high voltage difference at both ends of the current limiter. For facilitating the detection of voltage difference any "noise" caused by inductive voltage is compensated by a specific design.

Also JP 59-152604 relates to the detection of quench by measuring voltage difference. As in U.S. Pat. No. 5,999,383 referred to above "noise" caused by induced voltage is eliminated by a specific design.

In JP 2009-206237 use is made of voltage difference for detecting quench. The voltage difference measured is Fourier transformed for determining whether or not quenching has occurred.

OBJECTS AND SUMMARY

Nevertheless, there is a need for a quench detection system for a superconductor fault current limiter which can be operated at a simple, reliable manner and which, in particular, has a very fast response time.

This problem is solved by a quench detection system according to claim 5. Preferred embodiments are subjected matter of dependent claims 6 to 10.

The present invention provides a quench detection system comprising a differential protection relay. Further, the quench detection system of the present invention includes a voltage transformer which is connected at least to one end of the fault current limiter.

Further, the present invention relates to a method for detecting quench of a superconducting fault current limiter, wherein the voltage at the incoming end and the voltage at the outgoing end of a superconductor fault current limiter is compared, wherein the voltage difference occurring in fault event due to voltage drop across the fault current limiter is used to produce a current which is proportional to the magnitude of the voltage difference across the fault current limiter, wherein this current is supplied to a differential protection relay which compares the current with a pre-determined value and, if the current exceeds the pre-determined value, operates a triggering mechanism of a circuit breaker for interrupting current supply to the fault current limiter.

The quench detection system makes use of the voltage difference generated between both ends of a fault current limiter during quench. During normal operation, i.e. in the superconducting state, the voltage at each end of the current limiter is almost equal. In quench case a significant voltage drop occurs across the limiter resulting in a voltage difference between both ends.

According to one aspect the quench detection system of the present invention makes use of a differential protection relay. Differential protection relays are well known and are generally commercially available from various distributors.

Differential protection relays are used within electrical power systems, such as three-phase power transmission systems, to detect an abnormal operating condition by comparing the current flowing into an apparatus with the current flowing out of said apparatus. In normal operation the incoming current equals the outcoming current, however, in fault conditions a difference is observed causing the differential protection relay to produce a fault signal which causes a circuit breaker to open the electrical circuit. Examples for differential protection relays are those which are distributed by Siemens AG such as Siemens 7UT6131-5EA01-1AA0.

Differential protection relays are designed for the interpretation of current rather than of voltage. However, in fault current limiters in normal operation as well as in quench event the current flowing into the fault current limiter is always the same as the current flowing out the fault current limiter. According to the principle of the present quench detection system the voltage at both ends of the fault current limiter is transformed to a current being proportional to the voltage and the current is fed to a differential protection relay.

If the difference of the current signal of both ends of the fault current limiter exceeds a predetermined value the differential protection relay sends a fault signal to a circuit breaker for switching off current flow.

Thus, the present invention makes use of the very fast response time of only some milliseconds, for example of about 15 milliseconds, of differential protection relays for fault current limiters.

In principle, the present invention is not restricted to a specific type of superconductor. Superconductors are generally classified as either low or high temperature superconductors. High temperature superconductors are defined to have an onset or critical temperature (Tc) above the temperature of liquid nitrogen (77° K).

Suitable high temperature superconductors include, but are not limited to, ceramic oxide high temperature superconductors (referred to in the following "htsc") such as bismuth-based htsc, yttrium-based htsc, thallium-based htsc and mercury-based htsc.

Typical examples comprise Bi-Ae-Cu—$O_y$, (Bi, Pb)-Ae-Cu—$O_y$, Y-Ae-Cu—$O_y$, (Y, Re)-Ae-Cu—$O_y$, Tl-Ae-Cu—$O_y$, (Tl, Pb)-Ae-Cu—$O_y$ and Hg-Ae-Cu—$O_y$. In the above formula Ae means at least one alkaline earth element, particularly, Ba, Ca and Sr; Re means at least one rare earth element, particularly, La, Lu, Sc, Ce, Nd and Yb; and y represents the relative oxygen content in the range appropriate for the particular htsc.

Particularly preferred htsc are those known by the reference BSCCO-2212, BSCCO-2223, wherein the numerical combinations 2212 and 2223 stand for the stoichiometric ratios of the element Bi, Sr, Co and Cu, in particular those, wherein part of Bi is substituted by Ph; and those known by the reference YBCO-123 and YBCO-211, wherein the numerical combinations 123 and 211 stand for the stoichiometric ratios of the elements Y, Ba and Cu.

Besides the high temperature superconductors referred to above also superconductors having a Tc below 77° K can be used, such as $MgB_2$ with Tc of 39° K.

Superconductor based fault current limiters may have a variety of different configurations including resistive and inductive type current limiters. The present invention particularly relates to resistive type current limiters.

The current limiter may be composed of a bulk material having the shape of a cylinder, rod or coil. Further, the current limiter can be composed of a tape, typically having a relatively high aspect ratio, i. e. width greater than the thickness, for example, those generally known as coated conductors wherein a layer of superconductor material is deposited onto a substrate, typically with at least one buffer layer between substrate and superconductor layer; or a wire with an essential round diameter.

Since by the present quench detection system use can be made of differential protection relays, which are commercially available, a simple, but nevertheless, efficient system for quench detection can be established.

In particular, differential protection relays allow very fast, i.e. within some milliseconds, and sensitive detection of quench and signal transmittal.

BRIEF DESCRIPTION OF THE DRAWINGS

In the following the quench detection system of the present invention is further illustrated by reference to the accompanying figures showing exemplary embodiments of the present invention. It is shown in FIG. 1 a schematic circuit diagram of a first embodiment.

DETAILED DESCRIPTION

For simplicity the schematic diagrams in the figures follow the typical power system practice of showing a "one-line diagram". This allows a multiphase system, such as a three phase system typically for alternating current (AC), to be represented as a single phase diagram.

Figure 1:
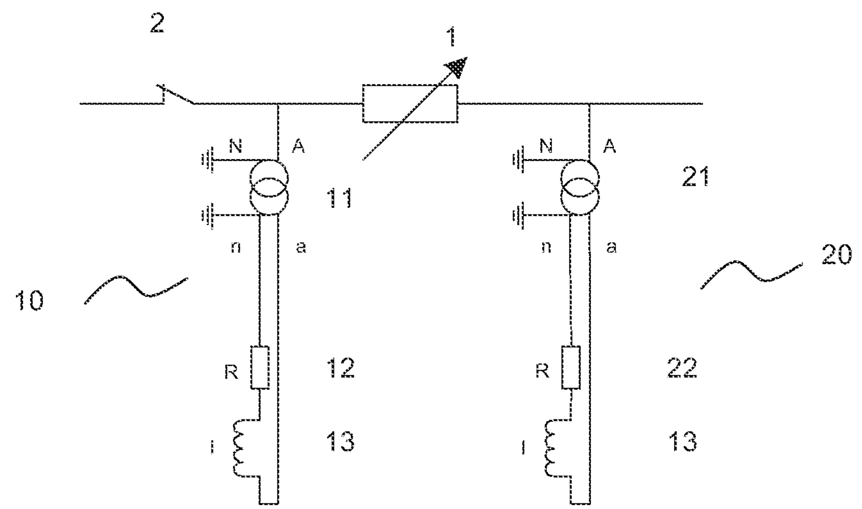

The electrical arrangement of a first embodiment of the present quench detection system is shown in FIG. 1.

It is shown a current limiter 1 with a current incoming end (left side) and a current outgoing end (right side). The incoming end of fault current limiter 1 is electrically connected to a first measuring circuit 10 and the outgoing end of the fault current limiter 1 to a second current measuring circuit 20.

In this embodiment each current measuring circuit 10, 20 comprises a voltage transformer 11, 21, a resistor 12, 22 and is connected to a differential protection relay 13 (represented by the coil symbol). The transformer 11, 21, resistor 12, 22 and differential protection relay 13, 32 are connected electrically in series in the consecutive order as referred to.

The transformers 11, 21 are connected electrically to an end of the fault current limiter 1 and are earthed. According to this embodiment the voltage at both ends of the fault current limiter 1 is measured to ground potential by the transformers 11, 21.

In the figure the primary site of transformers 11, 21 is indicated by capitals and the secondary site by small types with N,n=connected to earth and A,a=phase.

By the transformers voltage is converted to a lower level. Further, a current flow is generated in the current measuring circuit. Since the voltage at the primary site and the voltage at the secondary site are in proportion to each other the current corresponds to the voltage present at the respective end of the fault current limiter 1.

The current of the first and second current measuring circuit is each fed to an input of the differential protection relay 13. In this embodiment preferably a differential protection relay can be used which has at least two inputs, one for each current.

By the differential protection relay the current difference is calculated and compared with a predetermined value.

In normal operation there is nearly no voltage drop across the current limiter 1, since the current limiter 1 is in its superconducting state. Thus, at both transformers 11, 21 equal voltage is observed, for example of about $100/\sqrt{5}$ V. In normal operation the current difference is about 0 with $I_{11}-I_{21}\approx 0$ with $I_{11}$ current signal of transformer 11 and $I_{21}$ current signal of transformer 21.

In fault event voltage drop occurs across the current limiter 1 with the voltage at the outgoing end of the current limiter 1 being less than the voltage at the incoming end. Consequently, a current difference is observed by the differential protection relay. If the observed value of the current difference exceeds the predetermined value the differential protection relay sends a triggering signal to the circuit breaker 2 and current flow is interrupted.

Resistors 12, 22 can be provided between the transformers 11, 21 and the connection 13, 23 which can serve to reduce the current to a level which can be processed by the differential protection relay used. In order to maintain the proportionality of the current to the voltage at the respective end of the fault current limiter the ratio by which the current is reduced is the same for both resistors 12, 22. Preferably, adjustable resistors are used wherein the reduction ratio can be adjusted according to need.

For the purposes of the present invention there is no particular restriction to the transformer 11, 21 and resistor 12, 22. In principle any commercially available transformer and resistor, respectively, can be used. As set out above the transformer and resistor serve to convert voltage difference, which occurs in case of fault, to a current signal which is sufficiently low to be processed in the differential protection relay used.

Of course, in an embodiment as shown in FIG. 1 with two separate current measuring circuits 10, 20 the transformers and resistors used in each current measuring circuit must correspond to each other to allow reliable comparison of the current fed to the differential protection relay.

Figure 2:
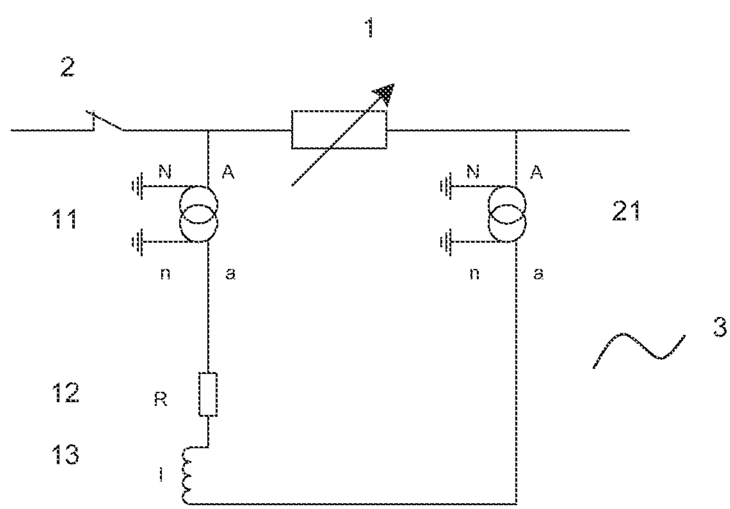
FIG. 2 a second embodiment of a fault current limiter with the quench detection system of the present invention.

Referring to FIG. 2 the electrical arrangement of a further embodiment of the quench detection system of the present invention is shown.

Unlike the embodiment shown in FIG. 1 the embodiment of FIG. 2 is composed of only one current measuring circuit and only one input of a differential protection relay is necessary.

As shown in FIG. 2 each end of the current limiter 1 is connected to a transformer 11, 21. Both transformers 11, 21 are electrically connected to each other via line 3, thus forming a current measuring circuit.

Furthermore, a differential protection relay 13 (represented by a coil symbol) is provided in line 3 between transformer 11 and transformer 21.

In normal operation with about equal voltage level at both ends of the current limiter 1 no current flow is generated between the transformers 11 and 21.

In case of fault, when voltage drop occurs with a lower voltage level at the outgoing end of current limiter 1, current flows from the end with the higher voltage level to the end with the lower voltage level. The magnitude of the current corresponds to the voltage difference and can be used for determining whether or not to interrupt current flow to the current limiter 1 by the differential protection relay. Since only one current signal has to be monitored in this embodiment a differential protection relay with one input is sufficient.

Downstream to transformer 11 a resistor 12 can be located for reducing the magnitude of the current to a level usable for the differential protection relay.

Figure 3:
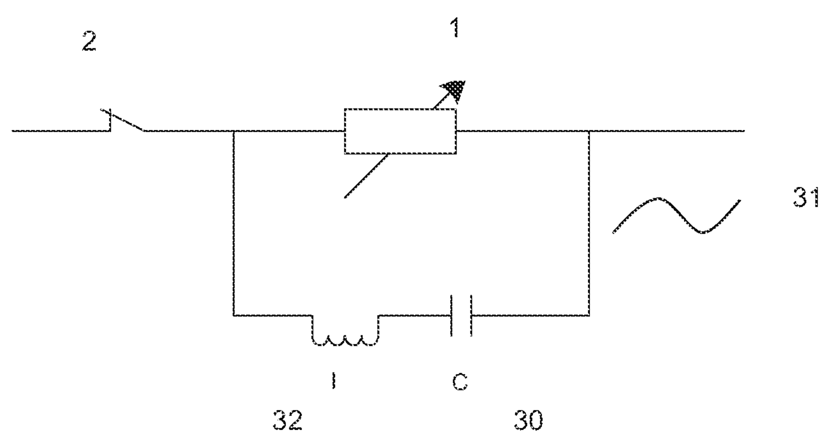
FIG. 3 a third embodiment of a fault current limiter.

FIG. 3 illustrates a third embodiment. In this embodiment a capacitor 30 is connected electrically in parallel to the fault current limiter 1 via line 31, thus forming a current measuring circuit. Each end of line 31 is connected to an end of the fault current limiter 1. The current measuring circuit of this embodiment is connected to a differential protection relay 32, indicated by coil symbol, interposed in line 31 between the incoming end of fault current limiter 1 and the capacitor 30. A circuit breaker 2 is provided upstream of the incoming end of the fault current limiter 1.

In quench case charging current flows across the capacitor 30 due to the voltage drop across the fault current limiter 1. Since the magnitude of the charging current corresponds to the voltage drop the charging current can be used by the differential protection relay 32 to determine whether or not to trigger circuit breaker 2, if a pre-determined current level is exceeded by the charging current.

This embodiment is advantageous in that in normal operation the capacitance of capacitor 30 can serve to compensate inductive losses of the fault current limiter 1.

For this embodiment a conventional high voltage capacitor can be used.

In the figures the configuration of a present quench detection system for one phase is shown. However, the quench detection system of the present invention can be easily adapted for current systems operated with current of more than 1 phase such as alternating current (AC) which has typically three phases. In this case for each phase a quench detection system of the present invention is provided.

The quench detection system of the present invention making use of a differential protection relay provides a simple method for very fast and sensitive detection of quench and interruption of current flow, if a predetermined current value is exceeded.

On detection of such a condition the protection relay operates a triggering mechanism of a circuit breaker, thereby opening the electrical circuit to protect electrical components downstream to the fault current limiter.

The invention claimed is:

1. Method for detecting quench of a superconductor fault current limiter, wherein the voltage at the incoming end and the voltage at the outgoing end of a superconductor fault current limiter are compared, wherein the voltage difference occurring in fault event due to voltage drop across the fault current limiter is used to produce a current which is proportional to the magnitude of the voltage difference across both ends of the fault current limiter; and wherein the current is monitored by a differential protection relay, which compares the current with a predetermined value and if the current exceeds the predetermined value operates a triggering mechanism of a circuit breaker for interrupting current supply to the fault current limiter.

2. Method according to claim 1, wherein a first current which is proportional to the voltage at the incoming end of the fault current limiter, and a second current which is proportional to the voltage at the outgoing end of the fault current limiter, are supplied to the differential protection relay which calculates the current difference and operates the triggering mechanism of the circuit breaker if the current difference exceeds the predetermined value.

3. Method according to claim 1, wherein the current supplied to the differential protection relay is proportional to the voltage difference of the voltage at both ends of the fault current limiter.

4. Method according to claim 1, wherein the current supplied to the differential protection relay is the charging current which flows across a capacitor which is electrically connected in parallel to the fault current limiter.

5. Quench detection system for detecting quench of a superconductor fault current limiter, wherein each end of the fault current limiter is connected to a current measuring circuit which is connected to a differential protection relay, wherein within the current measuring circuit a current is generated which is either proportional to the voltage across the fault current limiter or to the voltage at one end of the fault current limiter, wherein the current of each current measuring circuit is fed to the differential protection relay for comparing the current with a pre-determined current value, and wherein the differential protection relay operates a triggering mechanism of a circuit breaker in case that the current exceeds the predetermined current value.

6. Quench detection system according to claim 5, wherein the incoming end of the fault current limiter is connected to a voltage transformer of a first current measuring circuit and the outgoing end of the fault current limiter to a transformer of a second current measuring circuit for measuring the voltage at each end of the fault current limiter to earth and generation of a current which is proportional to the voltage at the respective end of the fault current limiter, wherein each current measuring circuit is connected to a differential protection relay which is located downstream to the voltage transformer within the current measuring circuit.

7. Quench detection system according to claim 6, wherein in each of the current measuring circuits a resistor is provided between the transformer and the respective differential protection relay.

8. Quench detection system according to claim 5, wherein each end of the fault current limiter is connected to a transformer which are connected electrically to each other via line and wherein a differential protection relay is interposed between transformers in line.

9. Quench detection system according to claim 8, wherein a resistor is provided between transformer and the differential protection relay.

10. Quench detection system according to claim 5, wherein a capacitor is connected electrically in parallel to the fault current limiter via line and wherein the capacitor is connected to a differential protection relay which is located in line between the capacitor and the incoming end of the fault current limiter.

11. Method of detecting quench of a superconductor fault current limiter and for operating a triggering mechanism of a circuit breaker, said method comprising the step of:

producing a current using the voltage difference occurring in a fault event due to voltage drop across the fault current limiter, said current being proportional to the magnitude of the voltage difference across both ends of the fault current limiter; and measuring said current with a differential protection relay in a quench detection system.

* * * * *